United States Patent
Sabin et al.

(10) Patent No.: US 9,246,985 B2
(45) Date of Patent: Jan. 26, 2016

(54) TECHNIQUES FOR PREVENT INFORMATION DISCLOSURE VIA DYNAMIC SECURE CLOUD RESOURCES

(75) Inventors: Jason Allen Sabin, Lehi, UT (US); Jeremy Ray Brown, Orem, UT (US); Lloyd Leon Burch, Payson, UT (US)

(73) Assignee: Novell, Inc., Provo, UT (US)

( * ) Notice: Subject to any disclaimer, the term of this patent is extended or adjusted under 35 U.S.C. 154(b) by 350 days.

(21) Appl. No.: 13/170,527

(22) Filed: Jun. 28, 2011

(65) Prior Publication Data

US 2013/0007840 A1 Jan. 3, 2013

(51) Int. Cl.
| | | |
|---|---|---|
| G06F 15/16 | (2006.01) | |
| H04L 29/08 | (2006.01) | |
| G06F 21/31 | (2013.01) | |
| G06F 21/55 | (2013.01) | |
| H04L 29/06 | (2006.01) | |
| H04W 4/00 | (2009.01) | |

(52) U.S. Cl.
CPC .............. *H04L 67/10* (2013.01); *G06F 21/316* (2013.01); *G06F 21/556* (2013.01); *H04L 63/20* (2013.01); *H04W 4/003* (2013.01)

(58) Field of Classification Search
CPC .................. G06F 9/5077; G06F 9/468; G06F 2221/2107; G06F 2221/2141; G06F 11/1484; G06F 11/3051; G06F 11/3058; G06F 2009/45562; G06F 2009/45566; G06F 2009/45587; G06F 2009/45575; G06F 21/72; G06F 21/78; H04L 63/0442; H04L 63/045; H04L 63/0457; H04L 63/0471; H04L 63/06; H04L 63/08; H04L 63/10; H04L 63/12; H04L 63/20; Y02B 60/162; Y02B 60/165; Y02B 60/142

USPC .............. 380/259; 726/3; 709/203, 225, 226, 709/227; 713/193

See application file for complete search history.

(56) References Cited

U.S. PATENT DOCUMENTS

| | | | |
|---|---|---|---|
| 7,945,587 B2* | 5/2011 | Hardy ........................... | 707/793 |
| 8,159,961 B1* | 4/2012 | Rai et al. ...................... | 370/252 |
| 2004/0068567 A1* | 4/2004 | Moran et al. .................. | 709/227 |
| 2005/0086298 A1* | 4/2005 | Campbell et al. ............. | 709/203 |
| 2007/0050770 A1* | 3/2007 | Geisinger ...................... | 718/100 |
| 2007/0094507 A1* | 4/2007 | Rush ............................. | 713/176 |
| 2008/0126813 A1* | 5/2008 | Kawakami .................... | 713/193 |
| 2009/0282101 A1* | 11/2009 | Lim et al. ...................... | 709/203 |
| 2011/0016536 A1 | 1/2011 | O'Brien et al. | |
| 2011/0022711 A1* | 1/2011 | Cohn ............................. | 709/225 |
| 2011/0055385 A1 | 3/2011 | Tung et al. | |
| 2011/0093847 A1* | 4/2011 | Shah ............................. | 718/1 |
| 2011/0131330 A1* | 6/2011 | Beaty et al. ................... | 709/227 |
| 2012/0084445 A1* | 4/2012 | Brock et al. ................... | 709/226 |
| 2012/0254447 A1* | 10/2012 | Popescu et al. ............... | 709/227 |

\* cited by examiner

*Primary Examiner* — Thuong Nguyen

(74) *Attorney, Agent, or Firm* — Schwegman Lundberg & Woessner, P.A.

(57) ABSTRACT

Techniques for preventing information disclosure via dynamic secure cloud resources are provided. Data (information) remotely housed on a particular cloud resource of a particular cloud is periodically, randomly, and dynamically changed to a different cloud resource within the same cloud or to a different cloud resource within an entirely different cloud. A requesting principal for the data is dynamically authenticated and a current location for the data is dynamically resolved and the principal is securely and dynamically connected to the current cloud resource and current cloud hosting the data for access.

7 Claims, 4 Drawing Sheets

TECHNIQUES FOR PREVENT INFORMATION DISCLOSURE VIA DYNAMIC SECURE CLOUD RESOURCES

BACKGROUND

Cloud computing is rapidly changing the Internet into a collection of clouds, which provide a variety of computing resources, storage resources, and, in the future, a variety of resources that are currently unimagined.

This new level of virtualization should have unbounded the physical and geographical limitations of traditional computing, but this is not yet the case largely in part because of current deficiencies for enterprises in securing, auditing, and controlling their virtualized assets over a network. That is, enterprises have been reluctant to outsource assets to cloud environments because, at least in part, of the perceived risk associated with exposure of confidential assets outsourced to external environments.

For example, a hacker typically collects and looks for vital information that will disclose where important documents, files, or other data are stored. This is typically associated with specific Internet Protocol (IP) addresses, Domain Name System (DNS), communication ports, and file names. Once a hacker discovers this information then he/she can attempt to locate and gain access to the machine for purposes of gaining access to other confidential data.

Therefore, the IP Addresses, DNS, Ports, and file names are all critical information that a company needs to protect and needs to proactively limit access to or knowledge of.

Essentially, the problem with storing critically sensitive data on a network-accessible server is that all an individual needs to know is where to access the server and/or details about the server. So, if a hacker can isolate where the server resides, the hacker can gain access to sensitive data of an enterprise.

SUMMARY

Various embodiments of the invention provide techniques for preventing information disclosure via dynamic secure cloud resources. Specifically, a method for securing network information is presented.

A determination is made that a remotely-housed resource is to be moved from a first machine to a second machine. Next, configuration details are acquired for the second machine and an encryption key is also obtained for the second machine. The remotely-housed resource is moved in an encrypted format, using the encryption key, from the first machine to the second machine and a mapping is updated that maps the remotely-housed resource to the second machine. The mapping originally mapped the remotely-housed resource to the second machine.

DETAILED DESCRIPTION

Figure 1:
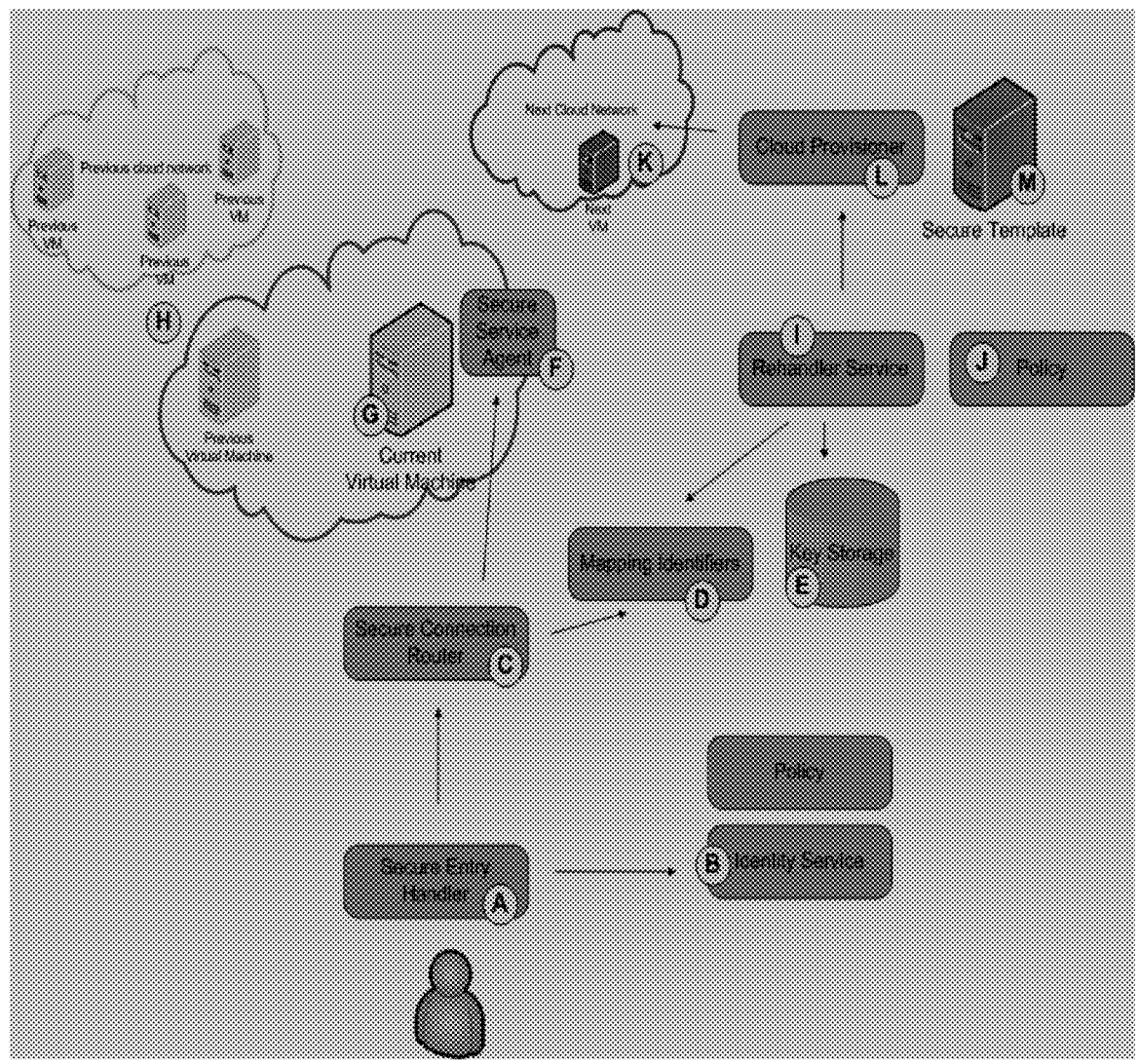
FIG. 1 is a diagram of an example architecture for preventing information disclosure via dynamic secure cloud resources, according to the techniques presented herein.

A "resource" includes a user, service, system, device, directory, data store, groups of users, combinations and/or collections of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

A "workload" as used herein refers to a special type of resource, such as a Virtual Machine (VM), an Operating System (OS), a hardware device, an agent, and/or an application.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," and the term "cloud" may be used interchangeably and synonymously herein.

Moreover, it is noted that a "cloud" refers to a logical and/or physical processing environment as discussed above.

Various embodiments of this invention can be implemented in existing network architectures. For example, in some embodiments, the techniques presented herein are implemented in whole or in part in the Novell® operating system products, directory-based products, cloud-computing-based products, and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented and reside within a non-transitory computer-readable storage media or machine-readable storage medium and are processed on the machines configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of the FIGS. 1-4.

FIG. 1 is a diagram of an example architecture for preventing information disclosure via dynamic secure cloud resources, according to the techniques presented herein. It is noted that the FIG. 1 is presented for purposes of illustration and comprehension. It is to be understood that other architectural arrangements can be used to achieve the teachings presented herein and below.

The components of the FIG. 1 are implemented in non-transitory and processor-readable storage medium and are executed on physical processors on one or more networks. Each processor specifically configured to execute the components.

The FIG. 1 is presented with reference to a specific example situation that an enterprise utilizing cloud environments can encounter. The example is presented for purposes of illustration only as other situations can occur as well and still benefit from the techniques presented herein and below.

In the context of the discussion with respect to the FIG. 1, consider that a user (X) wants to access a very secure document. The secure document is stored on a server but X has no idea where the server is. X does not know the IP address, DNS, communication port, or even file name of the secure document. All X knows is that he/she needs to access the secure document.

X pulls up a Secure Entry Handler application (A in the FIG. 1). This is a highly-secure application that has been installed on X's laptop (or other processor-enabled device of X). X inputs credentials to gain access to the Secure Entry Handler. The credentials are validated via an identity service (B in the FIG. 1). The evaluation of one or more policies also occurs, at B, to determine if X has access to the secure document and to determine what other types of documents X can access. X is then presented with a listing of document descriptions that X currently has access to.

In another case, access to the Secure Service Agent (F in the FIG. 1) or the Secure Connection Router (C in the FIG. 1) can be dynamic (bypassing the Secure Entry Handler—not show in the FIG. 1), such as via an encrypted routing token having: the IP address for the machine of the Secure Service Agent or Secure Connection Router, the IP address for the machine of X, and an identity for X. This token can be used for establishing a secure dynamic connection from X's machine to the Secure Service Agent's machine or the Secure Connection Router's machine.

Once a secure document is selected by X, a secure request is issued to the Secure Connection Router (C in the FIG. 1). This Secure Connection Router consults a Mapping-Identifiers listing (D in the FIG. 1). This extracts the current IP address, DNS, port number, and/or file name, and what key to use to connect with the hosting machine that presently has the secure document that X wants access to.

The Secure Connection Router then establishes a connection to that VM's Secure Service Agent (F in the FIG. 1) and gains access to the secure document that is being hosted on the Server (G in the FIG. 1).

It is noted that the secure document is currently being hosted on G (in the FIG. 1) and that the previous VM's that were hosting the secure document are on VM H (in the FIG. 1). So, previously the secure document was hosted on a different VM and within a same Cloud Network, but there are also instances (as noted in the FIG. 1) of other VM's in other Cloud Networks that have previously hosted the secure document.

Thus far, the discussion above has dealt with the end user's side of accessing the secure document. A description associated with the dynamic changing of the hosting VM's for the secure document is now presented.

There is a Rehandler Service (I in the FIG. 1) that checks the Policy (J in the FIG. 1) associated with the secure document. The Policy lists how often to change the location of the VM and where the secure document is stored at on a current VM being used. The policy itself can also be randomized. Randomization of the policy can be: time based, event based, and/or triggered on some other configured aspects to determine when re-handling needs to occur. When a situation, according to policy evaluation, occurs the Rehandler service determines if a new Cloud Network needs to be used and what other aspects need to change.

Additionally all the data points can be randomized, such as, a random name, a random IP address, and a random network; each of which is currently not in use.

For example, consider a situation where all data points are to be changed. The Rehandler Service contacts the Cloud Provisioner (L in the FIG. 1) to establish a new Cloud Network with: a new VM, a new port, and a new filename for the secure document. All of these data points are randomized and not part of any other existing VM's within the cloud's infrastructure. The Cloud Provisioner then clones a new VM from a secure template (M in the FIG. 1) and deploys the new VM within the new cloud network. The cloud network can be an entirely different private or public cloud, or can be a new 10.x.x.x type of network. The Cloud Provisioner creates the new VM and installs the Secure Service Agent running on the specified new port number with a new key.

Optionally, instead of using the Secure Service Agent, the IP address of the current hosting VM for the secure document along with the DNS and file name can be combined with an identity for X and an IP address for X's machine to form an encrypted token. The token facilitates direct and dynamic access to the current hosting machine.

Now that a new VM is operational for hosting the secure document, the Rehandler Service notifies the new VM that a new key needs to be generated. The new VM (K in the FIG. 1) generates a new public/private key pair. The new VM returns the public key to be stored in the Key Storage (E in the FIG. 1).

The Current VM (G in the FIG. 1) is notified that the current VM is up for de-commissioning or de-hosting of the secure document. The Current VM then retrieves the public key of the new VM from Key Storage where the public key is referenced by the Mapping Identifiers. The current VM encrypts the document with the public key and initiates a copy of the encrypted document to the Rehandler Service. The Rehandler Service forwards on the copied encrypted document to the New VM (K in the FIG. 1). Then once the New VM (K in the FIG. 1) has the file, the New VM can initiate a command that it is ready for service to provide the secure document.

Optionally, the Current VM can also copy the file directly to the New VM. For added security; however and in some embodiments as discussed above, the Current VM may have no knowledge of the New VM whatsoever, which is accessed via the Rehandler Service.

The Rehandler Service then updates the Mapping Identifiers (D in the FIG. 1) to the new VM. Once this has occurred, the Rehandler Service removes and destroys the previous VM (G in the FIG. 1). Any new requests for the secure document go directly to the new VM.

The Rehandler service performs the operations discussed above again as soon as the next triggered event happens.

The techniques discussed above and below provide the ability to gain access to highly-sensitive information via a random cloud based server, which has a dynamic and random IP address, listening port, and file name.

Information Disclosure has been a long time problem, which is widely discussed in the industry. The problem is solved herein via dynamic cloud resources, as discussed herein above and below, for purposes of preventing sensitive information disclosure.

Figure 2:
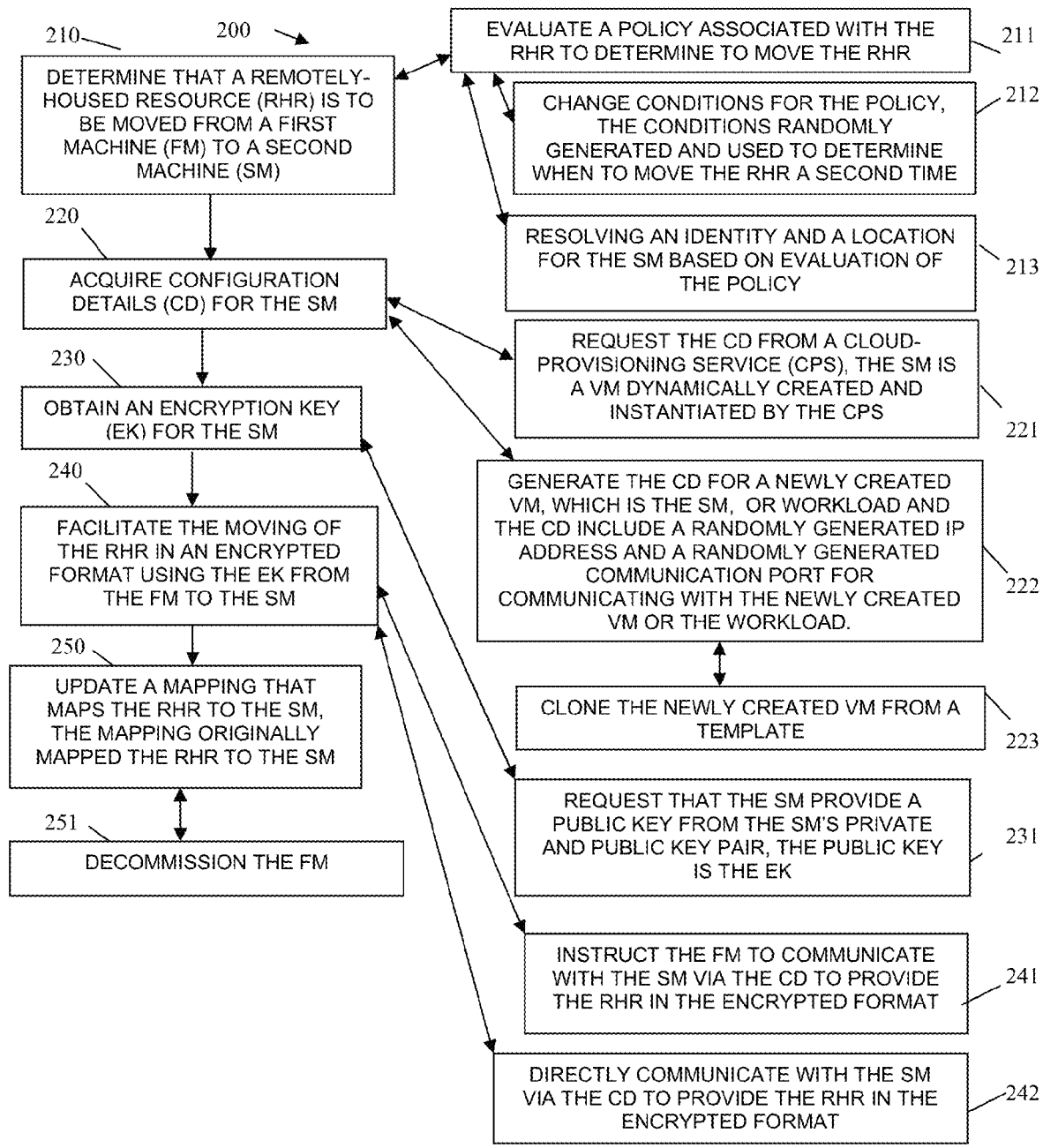
FIG. 2 is a diagram of a method for securing network information, according to an example embodiment.

FIG. 2 is a diagram of a method 200 for securing network information, according to an example embodiment. The method 200 (hereinafter "cloud-based information manager") is implemented and resides within a non-transitory computer-readable or processor-readable medium that executes on one or more processors of a network. Moreover, the cloud-based information manager is operational over a network and the network may be wired, wireless, or a combination of wired and wireless.

The cloud-based information manager is presented from the perspective of one or more network or cloud-based services that management movement and access to a secure resource. A secure resource is a resource that has security enforced before access is granted to that resource. The resource may include such things as a file, a document, an image, a video, a graphic illustration, an audio snippet, and the like. In some cases, the secure resource can also include an executable program or plugin that a principal desires to process.

At 210, the cloud-based information manager makes a determination that a remotely-housed resource is to be moved from a first machine to a second machine. The phrase "remotely-housed" is used to convey that the resource is managed over a network, such as but not limited to the Internet. The resource is external or remote from a requesting principal. The principal can be an end-user or an automated application or service being executed on behalf of an end-user. So, the resource is remote from the requesting principal that desires access to that resource.

According to an embodiment, at 211, the cloud-based information manager evaluates policy associated with the remotely-housed resource in order to make the determination that the remotely-housed resource is to be moved from the first machine to the second machine. The policy can include a variety of configured conditions that are dynamically evaluated by the cloud-based information manager based on a number of factors (some of which can be dynamically resolved as well).

Continuing with the embodiment of 211 and at 212, the cloud-based information manager changes conditions for the policy. In some cases, the changed conditions can be randomly generated by the cloud-based information manager and then subsequently used by the cloud-based information manager on different iterations of the processing to determine when to move the remotely-housed resource a second time and to an entirely different machine. In other words, the policy that is used to determine when to move the remotely-housed resource can itself be ever changing and the frequency of the changes as well as the changes themselves can be randomly generated conditions produced by the cloud-based information manager.

So, finding the location for storing the remotely-housed resource can be dynamically resolved based on evaluation of the policy, where the location is the second machine or an identity for the second machine, which permits the location to be resolved.

At 220, the cloud-based information manager acquires configuration details for the second machine. The configuration details can include a variety of metadata associated with creating, identifying, locating, and/or communicating with the second machine.

In an embodiment, at 221, the cloud-based information manager requests the configuration details from a cloud-provisioning service. This scenario was discussed above with respect to the processing of the FIG. 1. In this instance, the second machine is a virtual machine (VM), which is dynamically created and instantiated by the cloud-provisioning service on behalf of the cloud-based information manager.

In another scenario, at 222, the cloud-based information manager generates the configuration details for a newly created VM, which is the second machine or for a workload. The configuration details include a randomly generated IP address and a randomly generated communication port for communicating with the newly created VM or the workload.

Continuing with the embodiment of 222 and at 223, the cloud-based information manager clones the newly created VM from a template. This too was discussed above with respect to the FIG. 1.

At 230, the cloud-based information manager obtains an encryption key for the second machine. The remotely-housed resource is to be stored on the second machine in an encrypted format performed using an encryption key associated with the second machine.

In an embodiment, at 231, the cloud-based information manager requests that the second machine provide a public key from the second machine's private-public key pair. Here, the public key is the encryption key.

At 240, the cloud-based information manager facilitates moving of the remotely-housed resource in an encrypted format using the encryption key. The remotely-housed resource is moved dynamically from the first machine to the second machine. It is noted that the first and second machines can be within the same networked environment (same cloud) or that the first and second machines can each be associated with different networked environments (different clouds).

In an embodiment, at 241, the cloud-based information manager instructs the first machine to communicate with the second machine via the configuration details for purposes of providing the remotely-housed resource in the encrypted format. Here, the cloud-based information manager facilitates creating a secure connection (using encryption and/or encryption communication protocols) between the first machine and the second machine.

In another scenario, at 242, the cloud-based information manager directly communicates with the second machine via the configuration details to provide the remotely-housed resource in the encrypted format. Here, the first machine may, in some instances, be completely unaware of the configuration details and identity of the second machine; rather, the cloud-based information manager or sub-services of the cloud-based information manager are used to provide the remotely-housed resource to a principal of the first machine.

At 250, the cloud-based information manager updates a mapping that maps the remotely-housed resource to the second machine. The mapping originally mapped the remotely-housed resource to the second machine. This mapping can be housed in a repository, such as the one discussed above with respect to the discussion of the FIG. 1. Moreover, one or more sub-services can manage and provide the mapping and updates to the mapping. The mapping is a relation or link between an identity of the remotely-housed resource and a current machine (along with its configuration details) that currently (at the time of request) possesses the remotely-housed resource. So, when the remotely-housed resource is successfully migrated from the first machine to the second machine, the mapping is updated to reflect this change.

In an embodiment, at 251, the cloud-based information manager decommissions the first machine. That is, suppose the first machine was being used to solely manage distribution of the remotely-housed resource, in such a case, the first machine (which may be a VM) is removed, such that access to the first machine is no longer possible over a network connection.

Figure 3:
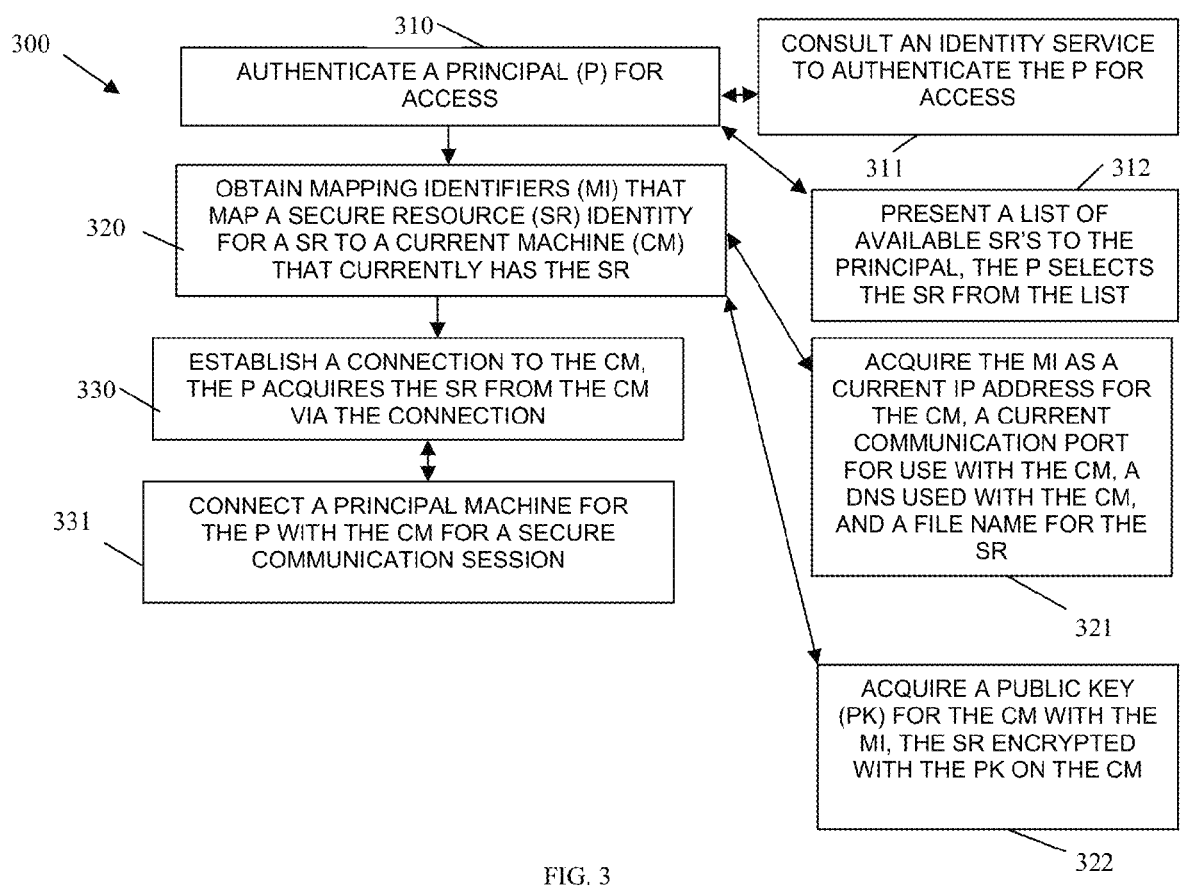
FIG. 3 is a diagram of another method for securing network information, according to an example embodiment.

FIG. 3 is a diagram of another method 300 for securing network information, according to an example embodiment. The method 300 (hereinafter "network information manager") is implemented and resides within a non-transitory computer-readable or processor-readable medium that executes on one or more processors of a network. Moreover, the network information manager is operational over a network and the network may be wired, wireless, or a combination of wired and wireless.

The network information manager presents another and in some cases enhanced perspective of the cloud-based information manager represented by the method 200 of the FIG. 2 and discussed in detail above. Specifically, the management for migration of a secure or remotely-housed resource within one or more networked environments (clouds) is presented as the cloud-based information manager; whereas, the network information manager is presented from the perspective of processing that occurs when a principal requests a secure resource for access.

At 310, the network information manager authenticates a principal (user or automated service acting on behalf of a principal) for access. A variety of authentication mechanisms were presented above with respect to the discussion of the FIG. 1.

For example, at 311, the network information manager consults an identity service for purposes of having the identity service authenticated the principal for access to secure resources being managed by the network information manager.

In an embodiment, at 312, the network information manager presents a list of available secure resources to the principal. The identity of the principal (resolved with authentication) can resolve a role for the principal and resolve a specific policy that is used for evaluation. The role and/or policy identify the types of resources and/or identities for resources that the principal is permitted to access, via the network information manager. These secure resources are presented with descriptive details in a list for the principal to make a selection. Again, this was discussed above with reference to the FIG. 1.

At 320, the network information manager obtains mapping identifiers that map a particular secure resource identity for a particular resource to a current machine or current processing environment that possess the desired secure resource or that is actively distributing the desired secure resource.

According to an embodiment, at 321, the network information manager acquires the mapping identifiers as a current IP address for the current machine, a current communication port for use with the current machine, a domain name system (DNS) used with the current machine, and a file name that identifies the secure resource. This information may also be viewed as the configuration details that were discussed above with reference to the FIG. 2.

In still another situation, at 322, the network information manager acquires a public key for the current machine with the mapping identifiers. Here, and for added security, the secure resource is encrypted with the public key of the current machine.

At 330, the network information manager establishes a connection to the current machine. The principal then acquires the secure resource from the current machine, via the connection. In some cases, the connection is secure (uses an encrypted communication protocol or passes data in an encrypted format).

According to an embodiment, at 331, the network information manager connects a principal machine for the principal with the current machine for a secure communication session. In other words, the principal machine and the current machine directly communicate via the secure communication session independent of the network information manager.

As stated before, in some alternative scenarios to 331, the network information manager or sub-services of the network information manager can act as a proxy to acquire the secure resource from the principal such that the principal machine does not directly communicate with the current machine but rather communicates indirectly via the network information manager.

Figure 4:
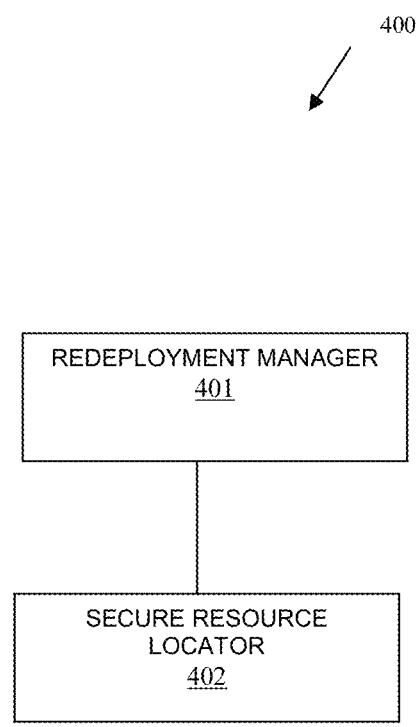
FIG. 4 is a diagram of a secure network information access system, according to the techniques presented herein.

FIG. 4 is a diagram of a secure network information access system 400, according to the techniques presented herein. The components of the secure network information access system 400 are implemented within and reside within a non-transitory and computer or processor-readable storage medium for purposes of executing on one or more processors of a network. The network may be wired, wireless, or a combination of wired and wireless.

The secure network information access system 400 implements, inter alia, various aspects of the FIG. 1, and the method 200 and the method 300 of the FIGS. 2 and 3, respectively.

The secure network information access system 400 includes a redeployment manager 401 and a secure resource locator 402. Each of these components and their interactions with one another will now be discussed in detail.

The redeployment manager 401 is implemented, resides, and is programmed within a non-transitory processor-readable (computer-readable) medium as instructions that process on one or more processors of a network. Example processing associated with the redeployment manager 401 was presented above with the description of the FIGS. 1-2.

The redeployment manager 401 is configured to regularly move a secure resource from a source machine and source environment to a current machine and current environment based on policy. That is, policy evaluation dictates when the redeployment manager 401 migrates a secure resource from a source machine to a current machine. The policy may also dictate resolving an identity for the current machine or even creation of the current machine (when the current machine is a VM). "Current machine" is a particular machine that at a given point in time when a request is made for the secure resource, the particular machine is in possession and/or is actively capable of distributing or providing access to the secure resource.

According to an embodiment, the redeployment manager 401 is also configured to decommission the source machine and dynamically create the current machine. In this instance both the source machine and the current machine are VMs.

The secure resource locator 402 is implemented, resides, and is programmed within a non-transitory processor-readable (computer-readable) medium as instructions that process on one or more processors of a network. Example processing associated with the secure resource locator 402 was presented above with the description of the FIGS. 1 and 3.

The secure resource locator 402 is configured to locate the secure resource on the current machine on behalf of a requesting principal and facilitate a connection between a machine of the principal and the current machine. The secure resource locator 402 dynamically and in real time resolves a present location for access a secure resource when a principal makes an authorized request for that secure resource. Again, the processing associated with these features was discussed above with reference to the FIGS. 1 and 3.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by one or more processors configured to perform the method, comprising:

determining to move a remotely-housed resource from a first machine to a second machine over a network based on a policy evaluation for the remotely-housed resource and the policy evaluation indicating a change in a current location for the remotely-housed resource on the first machine is to be made to a new location on the second machine and the policy evaluation identifying the second machine, and a policy evaluated in the policy evaluation is randomly generated based on time, the remotely-housed resource is a particular resource that is managed over the network and is external or remote from a requesting principal that requests the remotely-housed resource, and wherein the remotely-housed resource is a document;

acquiring configuration details for the second machine, the configuration details include specific metadata for creating the second machine as a dynamically created and installed virtual machine;

wherein acquiring further includes generating the configuration details for a newly created virtual machine (VM), which is the second machine, or a workload and the configuration details include a randomly generated Internet Protocol (IP) address and a randomly generated communication port for communicating with the newly created VM or the workload;

obtaining an encryption key for the second machine that machine, the second machine generating the encryption key and the encryption key is for and associated with the second machine;

facilitate moving of the remotely-housed resource in an encrypted format using the encryption key from the first machine to the second machine; and updating a mapping that maps the remotely-housed resource to the second machine, the mapping originally mapped the remotely-housed resource to the first machine.

2. The method of claim 1, wherein acquiring further includes requesting the configuration details from a cloud-provisioning service, the second machine is a virtual machine dynamically created and instantiated by the cloud-provisioning service.

3. The method of claim 1, wherein generating further includes cloning the newly created VM from a template.

4. The method of claim 1, wherein obtaining further includes requesting that the second machine provide a public key from the second machine's private and public key pair, the public key is the encryption key.

5. The method of claim 1, wherein facilitate moving further includes instructing the first machine to communicate with the second machine via the configuration details to provide the remotely-housed resource in the encrypted format.

6. The method of claim 1, wherein facilitate moving further includes directly communicating with the second machine via the configuration details to provide the remotely-housed resource in the encrypted format.

7. The method of claim 1, wherein updating further includes decommissioning the first machine.

* * * * *